(12) United States Patent
Miyashita

(10) Patent No.: US 8,654,432 B2
(45) Date of Patent: Feb. 18, 2014

(54) ELECTRO-OPTIC DEVICE AND ELECTRONIC APPARATUS

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/010,116

(22) Filed: Jan. 20, 2011

(65) Prior Publication Data

US 2011/0181937 A1  Jul. 28, 2011

(30) Foreign Application Priority Data

Jan. 25, 2010  (JP) .................................. 2010-012894

(51) Int. Cl.
 *G02F 1/153* (2006.01)
 *G02F 1/03* (2006.01)
 *G02F 1/07* (2006.01)

(52) U.S. Cl.
 USPC ........................... 359/267; 359/245; 359/263

(58) Field of Classification Search
 USPC ......... 359/237, 242, 245, 247, 263, 267, 290; 349/5, 58, 158, 157; 348/E5.141, 348/E5.143, E9.027; 361/600, 704
 See application file for complete search history.

(56) References Cited

U.S. PATENT DOCUMENTS

| 5,835,179 A | 11/1998 | Yamanaka |
| 6,819,464 B2 * | 11/2004 | Fujimori et al. ............... 359/246 |
| 7,119,863 B2 * | 10/2006 | Seki et al. ...................... 349/114 |
| 7,365,821 B2 * | 4/2008 | Dewa et al. .................... 349/161 |
| 2004/0125048 A1 * | 7/2004 | Fukuda et al. .................. 345/30 |

FOREIGN PATENT DOCUMENTS

| JP | 10123964 A |   | 5/1998 |   |
| JP | 2004-037874 | * | 2/2004 | ........... G02F 1/1333 |
| JP | 2004246080 A |   | 9/2004 |   |
| JP | 2006-98683 | * | 4/2006 |   |
| JP | 2006098683 |   | 4/2006 |   |
| JP | 2009145835 A |   | 7/2009 |   |

* cited by examiner

*Primary Examiner* — Thomas K Pham
*Assistant Examiner* — Brandi Thomas
(74) *Attorney, Agent, or Firm* — Lowe Hauptman & Ham, LLP

(57) ABSTRACT

An electro-optic device including: an electro-optical panel having an electro-optic substance held between an element substrate and an opposed substrate; and a dust-proof substrate bonded to a surface of the opposed substrate opposite from a surface thereof opposing the element substrate; wherein one of the opposed substrate and the dust-proof substrate is formed of a first material having a coefficient of linear expansion of a positive pole, and the other one of the opposed substrate and the dust-proof substrate is formed of a second material having a coefficient of linear expansion of a negative pole.

11 Claims, 7 Drawing Sheets

ELECTRO-OPTIC DEVICE AND ELECTRONIC APPARATUS

BACKGROUND

1. Technical Fields

The present invention relates to a technical field of electro-optic devices such as liquid crystal devices and electronic apparatuses having the electro-optic device such as liquid crystal projectors.

2. Related Art

When using a liquid crystal panel as an example of an electro-optic device of this type as a light valve in a liquid crystal projector, if foreign particles or dust (hereinafter, referred to as "dust" as needed) are adhered on a surface of the light valve, the image of the dust is projected on a projection screen as well, whereby the quality of displayed images may be lowered. Therefore, a dust-proof glass panel may be provided on an outer surface of a substrate which constitutes the liquid crystal panel.

Here, when the liquid crystal panel is in operation, heat may be generated in the device by absorption of light energy of light from a light source into the liquid crystal panel. Also, when bonding the dust-proof glass panel to the liquid crystal panel with an adhesive agent, these panels may be heated in order to solidify the adhesive agent. In this manner, when the liquid crystal panel or the dust-proof glass panel is exposed to high temperatures, a stress caused by thermal contraction or thermal expansion is generated in these members. The stress as described above may cause distortion in the liquid crystal panel, so that the distance between the substrates which constitute an electro-optic panel, for example, (that is, a gap between an element substrate and an opposed substrate) is changed and hence color shading in the displayed images may be resulted.

For example, JP-A-2006-98683 discloses a technology which alleviates the stress and hence restrains the color shading in the displayed images by forming a bonded portion between the dust-proof glass panel and the electro-optic panel to be small.

However, in the above-described JP-A-2006-98683, since it is necessary to form the bonded portion to be small, there arises a technical problem such that a process of forming the bonded portion becomes complicated in comparison with a case of forming the bonded portion between the dust-proof glass panel and the electro-optic panel all over as in the related art. In addition, since the surface area of the bonded portion is small, there also arises a technical problem such that the bonding strength between the dust-proof glass panel and the electro-optic panel is reduced.

SUMMARY

An advantage of some aspects of the invention is to provide an electro-optic device which is capable of displaying high quality images with less color shading by restraining generation of a stress which my occur when heated, and an electronic apparatus having such the electro-optic device.

In order to solve the above-described problems, the electro-optic device according to a first aspect of the invention includes an electro-optical panel having an electro-optic substance held between an element substrate and an opposed substrate; and a dust-proof substrate bonded to a surface of the opposed substrate opposite from a surface thereof opposing the element substrate, and one of the opposed substrate and the dust-proof substrate is formed of a first material having a coefficient of linear expansion of a positive pole, and the other one of the opposed substrate and the dust-proof substrate is formed of a second material having a coefficient of linear expansion of a negative pole.

It is preferable that the electro-optic panel includes electro-optic substance held between the element substrate and the opposed substrate. When the electro-optic panel is in operation, the display area is irradiated with light from a light source such as white lamp. The electro-optic panel realizes image display, for example, by modulating light incoming into the display area on the pixel-to-pixel basis. In the display area, for example, a plurality of pixels are arranged in a matrix pattern, and are electrically connected to scanning lines which supplies scanning signals and data lines for supplying image signals respectively. The respective pixels controls a state of alignment of electro-optic substance such as liquid crystal arranged so as to oppose thereto according to the potential of the image signals.

It is preferable that the dust-proof substrate is bonded to a surface of the opposed substrate opposite from a surface thereof opposing the element substrate. The dust-proof substrate prevents foreign particles or dust adhered to the surface of the electro-optic panel from lowering the image quality, for example, by being bonded to an outer surface of the electro-optic panel (that is, on the side of the opposed substrate not opposing the element substrate). The dust-proof substrate may be bonded to the electro-optic panel with an adhesive agent. In this case, a material having a high light transmission factor or a high coefficient of thermal conductivity is preferably used as the adhesive agent.

Specifically, one of the opposed substrate and the dust-proof substrate is formed of the first material having a coefficient of linear expansion of a positive pole, and the other one of the opposed substrate and the dust-proof substrate is formed of the second material having a coefficient of linear expansion of a negative pole. In this manner, by selecting materials having coefficients of linear expansion in polarities opposite from each other for the opposed substrate and the dust-proof substrate, the stresses which may be generated when heated can be alleviated. In other words, the stresses generated in the opposed substrate and the dust-proof substrate when heated are generated so as to cancel out each other.

Preferably, a wide bonded portion can be formed between the opposed substrate and the dust-proof substrate because the stresses can be alleviated by selecting suitable coefficients of linear expansion for the materials of the opposed substrate and the dust-proof substrate. Therefore, the color shading in the electro-optic panel can be alleviated while resolving the technological problems in the related art described above.

As described thus far, it is preferable that the electro-optic device which reduces the probability of occurrence of color shading, and hence achieves a high-quality image display is realized by reducing the stress when heated.

Preferably, the element substrate is formed of a material having a coefficient of linear expansion having the same polarity as the opposed substrate.

In this configuration, the same or similar stresses are generated in the element substrate and the opposed substrate when heated. In other words, distortion can hardly occur between the element substrate and the opposed substrate. Therefore, a change in gap between the element substrate and the opposed substrate which may occur when heated is prevented, so that the color shading in the displayed image can effectively be alleviated.

It is preferable that a light-shielding panel is provided on the side opposite from a surface of the dust-proof substrate bonded to the opposed substrate so as to come into contact with the dust-proof substrate, and the light-shielding panel is formed of a material having a coefficient of linear expansion of an opposite polarity from the material of the dust-proof substrate.

In this configuration, the light-shielding panel is provided on the side opposite from the surface of the dust-proof substrate bonded to the opposed substrate so as to come into contact with the dust-proof substrate. In other words, the dust-proof substrate is arranged so as to be sandwiched between the opposed substrate and the light-shielding panel. Here, the light-shielding panel is a panel-shaped member which defines the display area of the electro-optic panel at least partly by being disposed on the side of the electro-optic panel where the display light is emitted. The light-shielding panel is formed of a material having a low light reflection coefficient. Here, "having a low light reflection coefficient" means that the light reflection coefficient is lower than the materials of other members arranged in the periphery of the light-shielding panel.

In this configuration, specifically, the light-shielding panel is formed of a material having a coefficient of linear expansion of an opposite polarity from the material of the dust-proof substrate. In this manner, by selecting materials having coefficients of linear expansion in polarities opposite from each other as the materials of the light-shielding panel and the dust-proof substrate, the stresses generated when heated can be alleviated. In other words, the stresses, which are generated in the light-shielding substrate and the dust-proof substrate when heated, cancel out each other. Therefore, the stress generated in the electro-optic device when heated can be alleviated effectively, so that the electro-optic device which provides high-quality image display with less color shading is achieved.

The light-shielding panel is preferably formed of austenitic stainless when it is formed of a material having a coefficient of linear expansion of a positive pole. In this case, SUS304 (the typical coefficient of linear expansion is $17.3 \times 10^{-6}$ (/° C.)) or SUS430 (the typical coefficient of linear expansion is $10.4 \times 10^{-6}$ (/° C.)) which is a representative type of austenitic stainless steel is preferably used.

Preferably, the first material is quartz and the second material is neoserum.

In this configuration, by using quartz (the typical coefficient of linear expansion is approximately 0.30 to $0.60 \times 10^{-6}$ (/° C.)) as the first material having a coefficient of linear expansion of a positive pole and neoserum (the typical coefficient of linear expansion is approximately $-0.85$ to $-0.10 \times 10^{-6}$ (/° C.)) as the second material having a coefficient of linear expansion of a negative pole, the various modes described above are preferably realized.

Preferably, the electro-optic device of the invention, the electro-optic panel is a reflective type.

In this configuration, the electro-optic panel according to the invention is a reflective electro-optic panel which displays an image by modulating the light incoming into the display area on the pixel-to-pixel basis, and then reflecting the modulated light by a reflection film such as an Al (aluminum) film.

In order to solve the above-describe problem, it is preferable that the electronic apparatus includes the electro-optic device as described above (including other modes).

According to a second aspect of the invention, the electronic apparatus includes the electro-optic device as described above. Therefore, various electronic apparatuses which can display a high-quality image with less color shading, such as projecting display devices, TVs, cellular phones, electronic notepads, word processors, view-finder type or monitor direct view video tape recorders, workstations, TV telephone sets, POS terminals, and touch panels are realized.

Effects and other benefits of the invention will be apparent from DESCRIPTION OF EXEMPLARY EMBODIMENTS described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
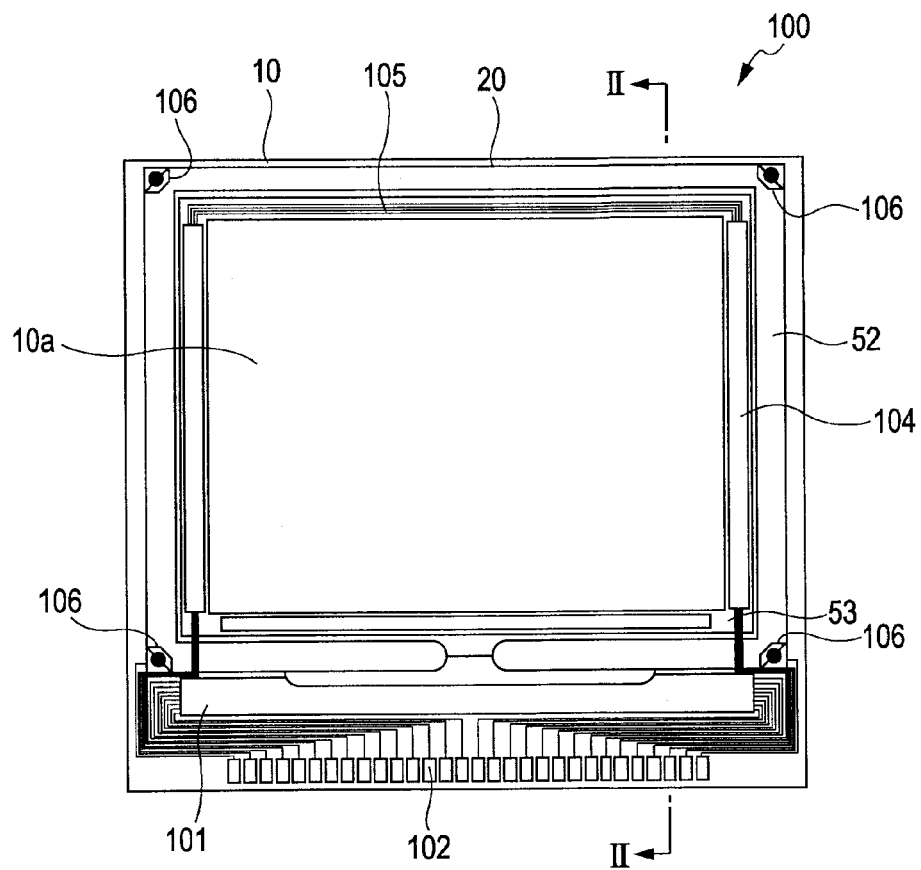
FIG. 1 is a plan view showing a general configuration of a liquid crystal panel provided in an electro-optic device according to an embodiment.

Referring now to the drawings, an embodiment of the invention will be described below.

Electro-Optic Device

First of all, a reflective liquid crystal panel 100 provided in an electro-optic device according to the embodiment will be described with reference to FIG. 1 to FIG. 3. The liquid crystal panel 100 is an example of an "electro-optic panel" according to the invention. In the embodiment shown below, a reflective liquid crystal panel of a drive-circuit-integrated TFT (Thin Film Transistor) active matrix drive system is exemplified.

First of all, a general configuration of the liquid crystal panel 100 provided in the electro-optic device according to the embodiment will be described with reference to FIG. 1 and FIG. 2. FIG. 1 is a plan view showing the general configuration of the liquid crystal panel 100 provided in the electro-optic device according to the embodiment. FIG. 2 is a cross-sectional view taken along the line in FIG. 1.

Figure 2:
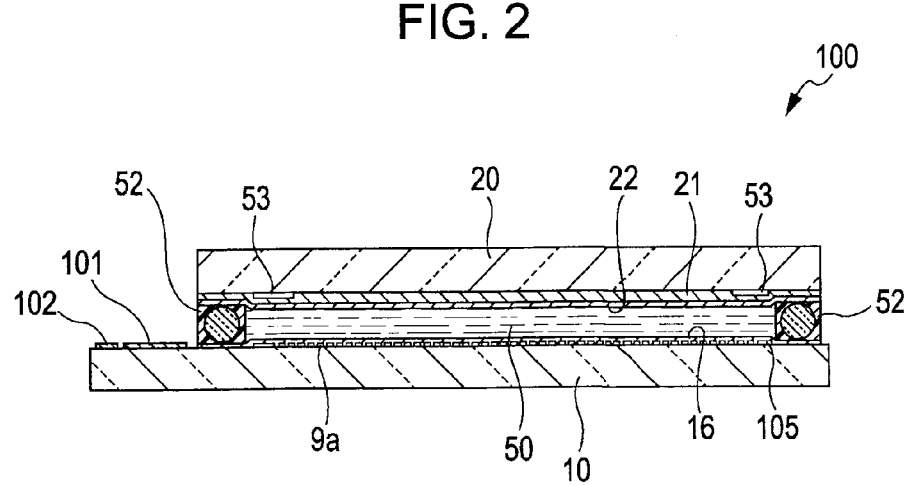
FIG. 2 is a cross-sectional view taken along the line II-II in FIG. 1.

In the liquid crystal panel 100 shown in FIG. 1 and FIG. 2, a TFT array substrate 10 and an opposed substrate 20 are arranged so as to oppose to each other. The TFT array substrate 10 is an example of an "element substrate" according to the invention, and the opposed substrate 20 is an example of an "opposed substrate" in the invention. The TFT array substrate 10 and the opposed substrate 20 are both formed of quartz, which is a material having a coefficient of linear expansion of a positive pole. The quartz is an example of a "first material" in the invention, and typically has a coefficient of linear expansion of approximately 0.30 to $0.60 \times 10^{-6}$ (/° C.). In the case of LCOS (Liquid Crystal on Silicon), a silicon substrate is used as the TFT array substrate 10.

Encapsulated between the TFT array substrate 10 and the opposed substrate 20 is a liquid crystal layer 50 as an example of an "electro-optic substance" in the invention. The liquid crystal layer 50 is formed of, for example, liquid crystal including one or more types of nematic liquid crystal mixed together and assumes a predetermined state of alignment between a pair of alignment films.

The TFT array substrate 10 and the opposed substrate 20 are bonded to each other with a sealing material 52 provided in a sealed area positioned around an image display area 10a having a plurality of pixel electrodes provided thereon.

The sealing material 52 is formed of, for example, UV-cured resin, heat cured resin for bonding the both substrates to each other, and is formed by being applied on the TFT array substrate 10 and then cured by irradiation of UV light or heating in a manufacturing process. The sealing material 52 includes gap material such as glass fibers or glass beads for fixing a distance between the TFT array substrate 10 and the opposed substrate 20 (that is, an inter-substrate gap) to a predetermined value dispersed therein. The gap material may be arranged in the image display area 10a or a peripheral area positioned in the periphery of the image display area 10a in addition to or instead of the one mixed in the sealing material 52.

A light-shielding frame-like light-shielding film 53 which partly defines a frame area of the image display area 10a is provided on the side of the opposed substrate 20 inside the sealed area where the sealing material 52 is arranged so as to extend in parallel thereto. The frame-like light-shielding film 53 provided on the side of the opposed substrate 20 defines the image display area 10a together with a parting panel 600 as an example of a light-shielding panel provided on a dust-proof substrate 400, described later. Detailed description about the dust-proof substrate 400 and the parting panel 600 will be made later.

In the peripheral area, specifically, in an area positioned outside the sealed area where the sealing material 52 is arranged, a data line drive circuit 101 and an external circuit connecting terminal 102 are provided along one side of the TFT array substrate 10. A scanning line drive circuit 104 is provided so as to extend along two sides adjacent to the one side and be covered with the frame-like light-shielding film 53. In addition, in order to connect the two scanning line drive circuits 104 provided on both sides of the image display area 10a described above, a plurality of wirings 105 are provided so as to extend along a remaining side of the TFT array substrate 10 and be covered with the frame-like light-shielding film 53.

Arranged in areas opposing four corners of the opposed substrate 20 on the TFT array substrate 10 are vertically conducting terminals 106 for connecting the both substrates with vertically conducting members 107. Accordingly, electrical conduction is achieved between the TFT array substrate 10 and the opposed substrate 20.

In FIG. 2, a laminated structure is formed on the TFT array substrate 10. The laminated structure includes a TFT for switching pixels as a drive element, and wirings such as scanning lines and data lines built therein. Although a detailed configuration of the laminated structure is not illustrated in FIG. 2, reflective pixel electrodes 9a as reflective electrodes are provided on the laminated structure. The pixel electrodes 9a are formed of a material having high light-reflecting properties such as aluminum as a typical example into an island shape in a predetermined pattern on pixel-to-pixel basis and reflect incident light. In the case of a transmissive liquid crystal panel, the pixel electrodes 9a are formed of transparent material such as ITO.

The pixel electrodes 9a are formed so as to oppose an opposed electrode 21 in the image display area 10a on the TFT array substrate 10. Formed on a surface of the TFT array substrate 10 on the side where the liquid crystal layer 50 opposes, that is, on the pixel electrodes 9a is an alignment film 16 so as to cover the pixel electrodes 9a.

Formed on a surface of the opposed substrate 20 opposing the TFT array substrate 10 is the opposed electrode 21 formed of the transparent material such as ITO so as to oppose the plurality of pixel electrodes 9a. A color filter, not shown in FIG. 2, may be formed in an area including an opening area and part of a non-opening area for color display in the image display area 10a. An alignment film 22 is formed on the opposed electrode 21 on the surface opposing the opposed substrate 20. It is also possible to form the light-shielding film in a grid pattern of a stripe pattern on the opposed substrate 20 to provide the non-opening area in the same manner as in the transmissive liquid crystal device.

In addition to the drive circuits such as the data line drive circuit 101 and the scanning line drive circuit 104 described above, the TFT array substrate 10 shown in FIG. 1 and FIG. 1 may have a sampling circuit configured to sample image signals on image signal lines and supply the sampled image signals to data lines, a pre-charge circuit configured to supply pre-charged signals of a predetermined voltage level respectively to a plurality of the data lines prior to the image signals, and an evaluation circuit configured to evaluate the quality or defects of the liquid crystal panel 100 during manufacture or at the time of shipping formed thereon.

Figure 3:
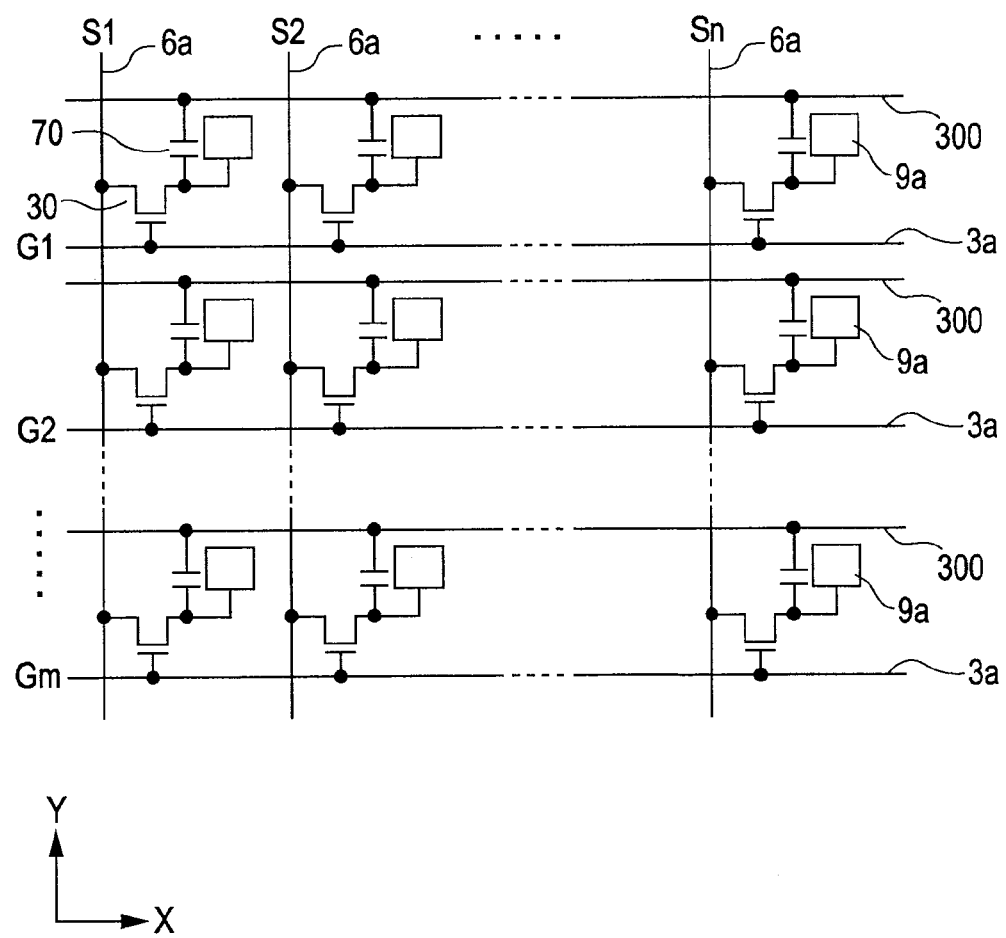
FIG. 3 is an equivalent circuit drawing showing various elements and wirings in a plurality of pixels formed into a matrix pattern which constitute an image display area of the liquid crystal panel provided in the electro-optic device according to the embodiment.

Referring now to FIG. 3, an electric configuration, of pixel portions of the liquid crystal panel 100 in the embodiment will be described. FIG. 3 is an equivalent circuit drawing showing various elements and wirings in the plurality of pixels formed into a matrix pattern which constitute the image display area of the liquid crystal panel provided in the electro-optic device according to the embodiment.

In FIG. 3, the plurality of pixels formed in a matrix pattern to constitute the image display area 10a each include the pixel electrode 9a and a TFT 30. The TFTs 30 are electrically connected to the pixel electrodes 9a respectively, and control switching of the pixel electrodes 9a when the liquid crystal panel 100 is in operation. Data lines 6a which receive supply of image signals are electrically connected to sources of the TFTs 30. The image signals S1, S2, ..., Sn to be written in the data lines 6a may be supplied in this sequence, or may be supplied to a plurality of the data lines 6a adjacent to each other on a group-to-group basis.

Scanning lines 3a are electrically connected to gates of the TFTs 30, and the liquid crystal panel 100 is configured to apply scanning signals G1, G2, ... Gm to the scanning lines 3a in the this sequence in a pulsed manner. The pixel electrodes 9a are electrically connected to drains of the TFTs 30, and the image signals S1, S2, . . . , Sn supplied from the data lines 6a are written at a predetermined timing by closing switches of the TFTs 30 as the switching elements for a certain period. The image signals S1, S2, . . . , Sn at a predetermined level written in the liquid crystal via the pixel electrodes 9a are maintained with respect to the opposed electrodes formed on the opposed substrate for a certain period.

The liquid crystal configuring the liquid crystal layer 50 (see FIG. 2) modulates light by a change of alignment or order of molecular association according to the applied voltage level and hence is capable of providing gray scale. For example, if it is a normally white mode, the transmission factor with respect to the incident light is reduced according to the applied voltage on the pixel-to-pixel basis. In contrast, if it is a normally black mode, the transmission factor with respect to the incident light is increased according to the applied voltage on the pixel-to-pixel basis. Therefore, light having contrast according to the image signals is emitted from the liquid crystal panel 100 as a whole.

In order to prevent the image signals held here from leaking, stored capacities 70 are added in parallel to liquid crystal capacities formed between the pixel electrodes 9a and the opposed electrode 21 (see FIG. 2). The stored capacity 70 is a capacity element which functions as a holding capacity which holds the potential of the each pixel electrode 9a according to the supply of the image signal. One of the electrodes of the stored capacity 70 is electrically connected to the drain of the TFT 30 in parallel to the pixel electrode 9a, and the other electrode is electrically connected to a capacity line 300 having a fixed potential so as to achieve a constant potential. With the provision of the stored capacities 70, the potential holding characteristics in the pixel electrodes 9a are improved, so that improvement of display characteristics such as improvement of contrast and reduction of flicker is achieved.

Figure 4:
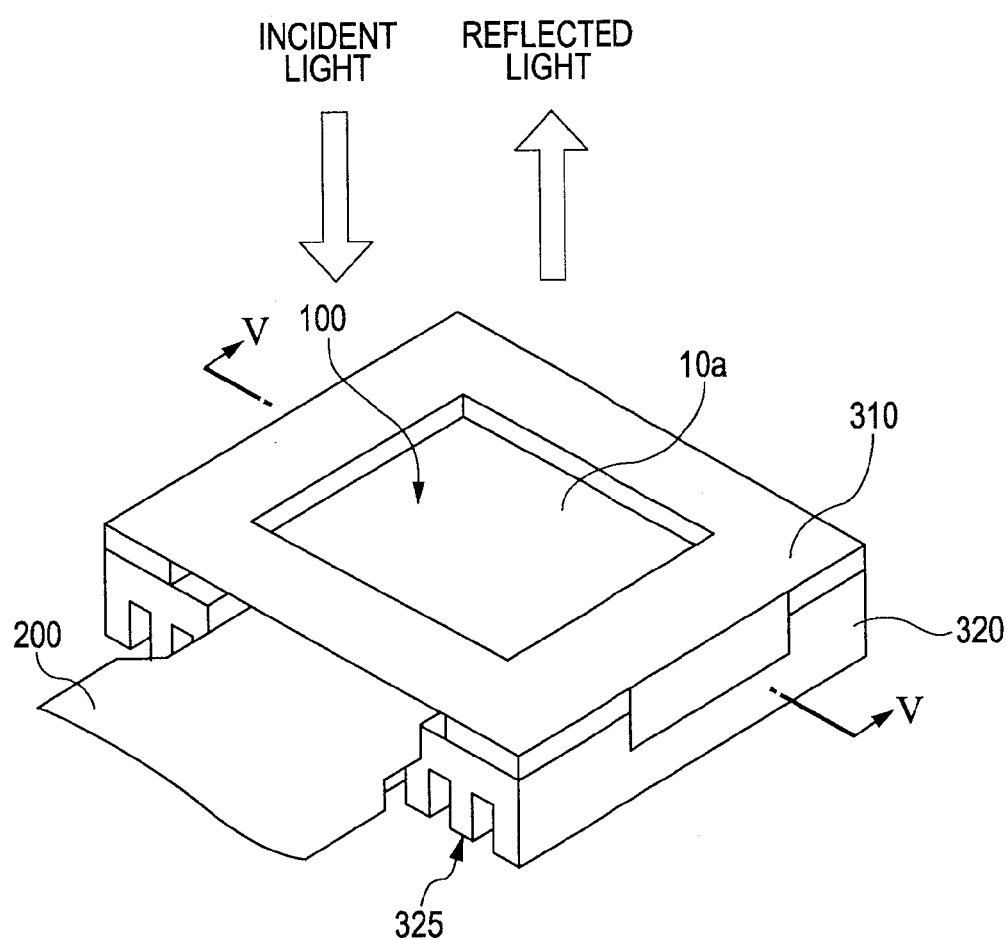
FIG. 4 is a perspective view showing a general configuration of the electro-optic device according to the embodiment.
Figure 5:
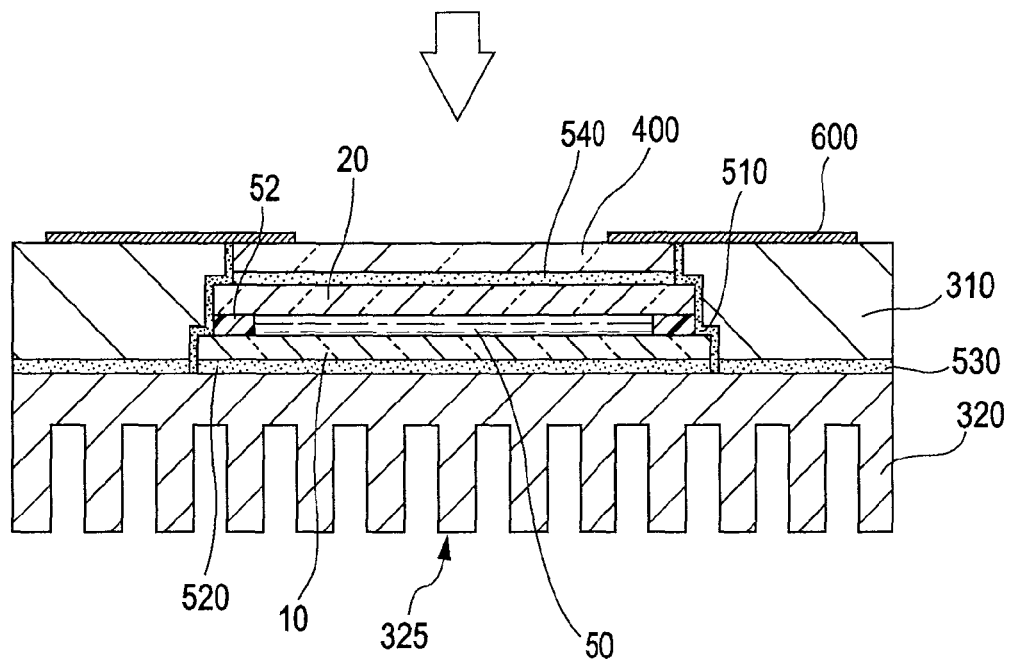
FIG. 5 is a cross-sectional view showing a detailed configuration of the electro-optic device according to the embodiment.

Referring now to FIG. 4 and FIG. 5, a general configuration of the electro-optic device according to the embodiment will be described. FIG. 4 is a perspective view showing the general configuration of the electro-optic device according to the embodiment. In the drawing from FIG. 4 onward, illustration of detailed members in the liquid crystal panel 100 shown in FIG. 1 and FIG. 2 are omitted as needed.

In FIG. 4, the electro-optic device according to the embodiment includes the liquid crystal panel 100, a flexible substrate 200, a frame 310, and a heat sink 320.

The flexible substrate 200 is connected to the external circuit connecting terminal 102 of the liquid crystal panel 100. The flexible substrate 200 is a substrate including signal wirings for feeding various control signals required for electro-optic actions of the liquid crystal panel 100 described above and, for example, is formed with the signal wirings or the like patterned on a base member such as polyimide. A driving IC chip including at least part of the drive circuit for driving the liquid crystal panel 100 may be arranged on the flexible substrate 200. The other end of the flexible substrate 200 opposite from the end connected to the liquid crystal panel 100 is pulled outward of the frame 310 and the heat sink 320, and is connected to an external circuit (not shown) for supplying the various control signals required for the electro-optic actions of the liquid crystal panel 100.

The frame 310 holds the liquid crystal panel 100 from the side of the display surface having the image display area 10a provided thereon. The frame 310 also functions as a parting member which restricts the incident light and reflected light of the liquid crystal panel 100 in addition to the function as a holding member for holding the liquid crystal panel 100. In particular, in this embodiment, the frame 310 is formed so as to contain metal superior in thermal conductivity such as iron, copper, aluminum, and magnesium so as to function also as a heat radiating member of the liquid crystal panel 100 together with the heat sink 320 described below.

The heat sink 320 holds the liquid crystal panel 100 from the back side opposite from the display surface. The heat sink 320 includes a heat radiating portion 325 for radiating heat generated in the liquid crystal panel 100. Accordingly, occurrence of various problems such as operation failure of the liquid crystal panel 100 due to the accumulation of heat in the liquid crystal panel 100 can be prevented. The heat sink 320 is recommended to be formed of a material containing materials having a high thermal conductivity such as iron, copper, or aluminum in order to enhance the heat dissipation effect.

The frame 310 and the heat sink 320 are joined to each other at a joint portion, not shown. The joining here may be achieved by fitting a depression provided on the frame 310 and a projection provided on the heat sink, or may be achieved using an adhesive agent or screws.

Subsequently, referring to FIG. 5, a further detailed configuration of the electro-optic device according to the embodiment will be described. FIG. 5 is a cross-sectional view showing a detailed configuration of the electro-optic device according to the embodiment.

In FIG. 5, the liquid crystal panel 100 and the frame 310 are bonded to each other with an adhesive agent 510. The adhesive agent 510 is provided from the front surface to the side surface of the liquid crystal panel 100. Provided on the display surface of the liquid crystal panel 100 (that is, the surface on the side irradiated with the incident light) is the dust-proof substrate 400. The dust-proof substrate 400 is an example of a "dust-proof substrate" in the invention. The dust-proof substrate 400 is bonded to the opposed substrate 20 in the liquid crystal panel 100 using a transparent adhesive agent 540. The dust-proof substrate 400 is bonded to the opposed substrate 20 on the side which does not oppose the TFT array substrate 10, and is an example of an expression "provided on a side of the opposed substrate not opposing the element substrate". The parting panel 600 which partly defines the image display area 10a is provided on a surface of the dust-proof substrate 400 opposite from the surface bonded to the opposed substrate 20 so as to come into contact with the dust-proof substrate 400. The parting panel 600 is engaged with the frame 310 at an engaged portion, not shown. The dust-proof substrate 400 is formed of neoserum as an example of a "second material" according to the invention. Here, neoserum is a material having a coefficient of linear expansion of a negative pole (the typical coefficient of linear expansion is approximately $-0.85$ to $-0.10 \times 10^{-6}$ (/° C.)), and has a coefficient of linear expansion of having opposite polarity from quartz as a material of the opposed substrate 20. The parting panel 600 is formed of SUS304 (the typical coefficient of linear expansion is $17.3 \times 10^{-6}$ (/° C.), which is a representative type of austenitic stainless steel. As a material used for the parting panel 600 may be SUS430 (the typical coefficient of linear expansion is $10.4 \times 10^{-6}$ (/° C.)) which is another representative type of austenitic stainless steel.

Figure 6:
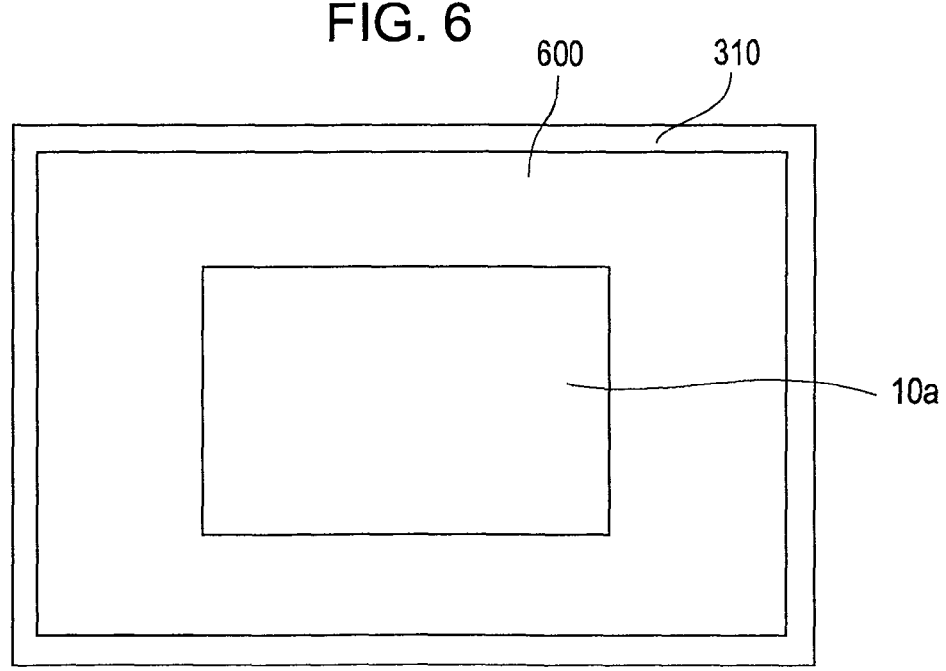
FIG. 6 is a plan view showing a configuration of a parting panel provided in the electro-optic device according to the embodiment.

Referring now to FIG. 6, a planar shape of the parting panel 600 provided in the electro-optic device according to the embodiment will be described. FIG. 6 is a plan view showing a configuration of the parting panel 600 provided in the electro-optic device according to the present invention.

The parting panel 600 is provided so as to surround the image display area 10a, and prevents light from entering an area other than the image display area 10a. The parting panel 600 is formed of a material having a lower light reflection coefficient than the member such as the frame 310 arranged around the parting panel 600.

Returning back to FIG. 5, the liquid crystal panel 100 and the heat sink 320 are bonded to each other with grease 520. The grease 520 has a higher thermal conductivity than air and is capable of conducting heat generated in the liquid crystal panel 100 efficiently to the heat sink 320. Therefore, the heat dissipation effect in the heat radiating portion 325 can be enhanced.

Grease 530 is filled also between the frame 310 and the heat sink 320. Therefore, the heat can be conducted efficiently from the frame 310 to the heat sink 320. In other words, the heat conducted from the liquid crystal panel 100 to the frame 310 can be radiated efficiently by the heat radiating portion 325 of the heat sink 320.

The greases 520 and 530 according to the embodiment are applied so as to be filled between the liquid crystal panel 100 and the heat sink 320 and between the frame 310 and the heat sink 320. However, the greases 520 and 530 may be applied only partly, or may not be applied between the liquid crystal panel 100 and the heat sink 320 and between the frame 310 and the heat sink 320. The grease 520 and the grease 530 must simply be a member having a thermal conductivity and, for example, a sheet or an adhesive agent having a thermal conductivity may be employed instead of or in addition to grease.

Figure 7:
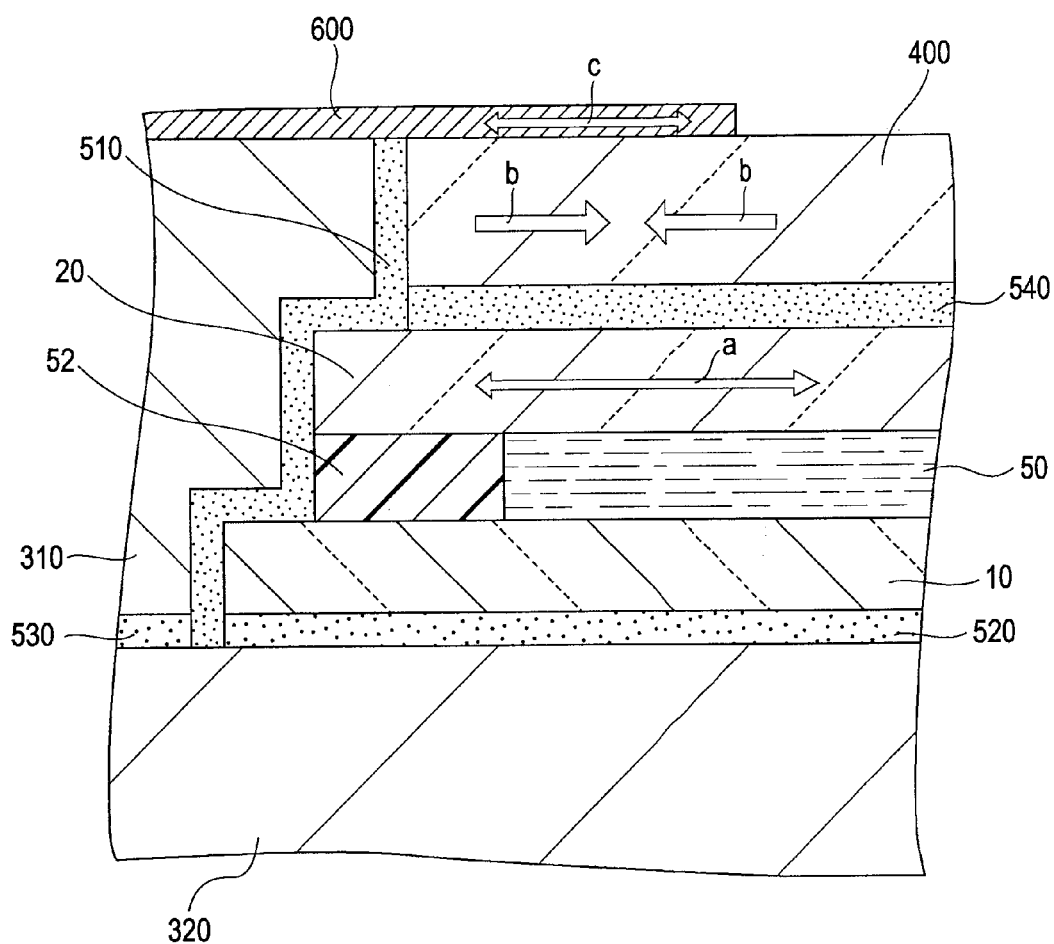
FIG. 7 is an enlarged cross-sectional view schematically showing a stress applied to respective members of the electro-optic device according to the embodiment.

Referring now to FIG. 7, distribution of a stress generated in the electro-optic device according to the embodiment will be described. FIG. 7 is an enlarged cross-sectional view schematically showing stresses applied to respective members of the electro-optic device according to the embodiment.

When heat is generated in the interior of the electro-optic device due to the operation of the electro-optic device, thermal expansion or thermal contraction occurs at respective portions which constitute the electro-optic device. The opposed substrate 20 is formed of quartz, which is a material having a coefficient of linear expansion of a positive pole, and hence is deformed in the direction of expansion. The stress generated in the interior of the opposed substrate 20 at this time is schematically shown by an arrow "a" in FIG. 7. In contrast, the dust-proof substrate 400 is formed of neoserum, which is a material having a coefficient of linear expansion of a negative pole, and hence is deformed in the direction of contraction. The stress generated in the interior of the dust-proof substrate 400 at this time is schematically shown by arrows "b" in FIG. 7.

Figure 8A:
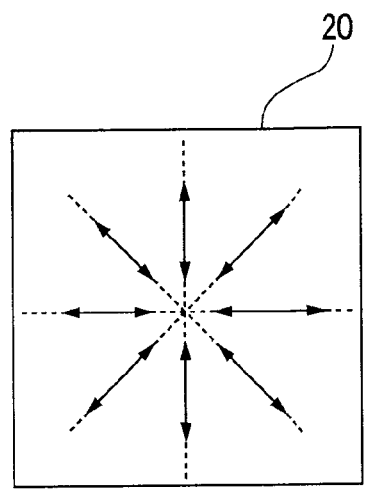
FIG. 8A is a plan view schematically showing distribution of a stress generated in an opposed substrate and a dust-proof substrate of the electro-optic device when heated according to the embodiment.
Figure 8B:
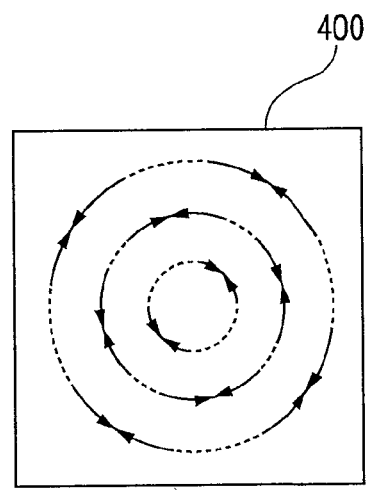
FIG. 8B is a plan view schematically showing distribution of the stress generated in the opposed substrate and the dust-proof substrate of the electro-optic device when heated according to the embodiment.
Figure 8C:
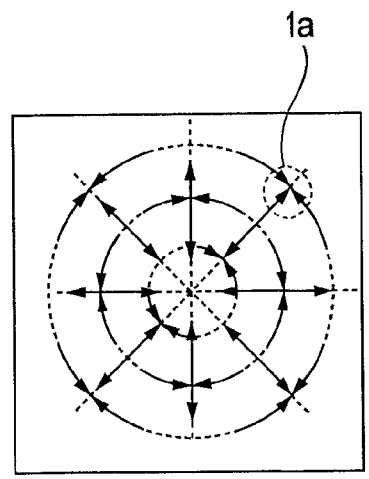
FIG. 8C is a plan view schematically showing distribution of the stress generated in the opposed substrate and the dust-proof substrate of the electro-optic device when heated according to the embodiment.

FIG. 8A to FIG. 8C are schematic views schematically showing distribution of the stress generated in the opposed substrate and the dust-proof substrate of the electro-optic device when heated according to the embodiment.

As described above, the stress is generated in the opposed substrate 20 in the direction of expansion which may occur when heated. This stress is distributed radially outward from the center portion of the opposed substrate 20 as shown in FIG. 8A on the basis of the characteristics of the material, "quartz". In contrast, in the dust-proof substrate 400, the stress is generated in the direction of contraction when heated. This stress is distributed concentrically outward in the periphery of the center portion of the dust-proof substrate 400 as shown in FIG. 8B on the basis of the characteristics of the material, "neoserum".

FIG. 8C is a schematic drawing showing the stresses generated in the opposed substrate 20 and the dust-proof substrate 400 when heated so as to be overlapped on the same plane. As shown by surrounding with a dotted line 1a, the stress in the opposed substrate 20 distributed radially and the stress in the dust-proof substrate 400 distributed concentrically are orthogonal to each other. Therefore, the stress in the opposed substrate 20 and the stress in the dust-proof substrate 400 are alleviated by being cancelled out with respect to each other. Consequently, distortions in the opposed substrate 20 and the dust-proof substrate 400 caused by the stresses generated when heated (for example, a change of gap between the TFT array substrate 10 and the opposed substrate 20) can be restrained, so that the color shading of the display image on the liquid crystal panel 100 is resolved and the image quality can be improved.

Returning back to FIG. 7 again, since the parting panel 600 is formed of austenitic stainless, which is a material having a coefficient of linear expansion of a positive pole, the parting panel 600 is deformed in the direction of expansion. The stress generated in the interior of the opposed substrate 20 at this time is schematically shown by an arrow "c" in FIG. 7. In contrast, as described above, the stress is generated in the dust-proof substrate 400 in the direction of contraction when heated. This stress is distributed concentrically outward in the periphery of the center portion of the dust-proof substrate 400 as shown in FIG. 8B on the basis of the characteristics of the material, "neoserum". The stresses generated in the dust-proof substrate 400 and the parting panel 600 when heated are alleviated by being cancelled out with respect to each other in the same manner as the stresses generated in the opposed substrate 20 and the dust-proof substrate 400 as described above.

Materials and sizes of the opposed substrate 20, the dust-proof substrate 400, and the parting panel 600 may be selected in their entirety so that the stresses are set off by cancelling out the stresses when heated. In other words, by setting the sum of the vectors of the stresses among the opposed substrate 20, the opposed substrate 20, the dust-proof substrate 400, and the parting panel 600 to be as close to zero as possible, the stress can be alleviated further efficiently.

As described thus far, according to the embodiment, the electro-optic device which reduces the probability of occurrence of color shading, and hence achieves a high-quality image display is realized by reducing the stress in association with the heat generation.

Electronic Apparatus

Figure 9:
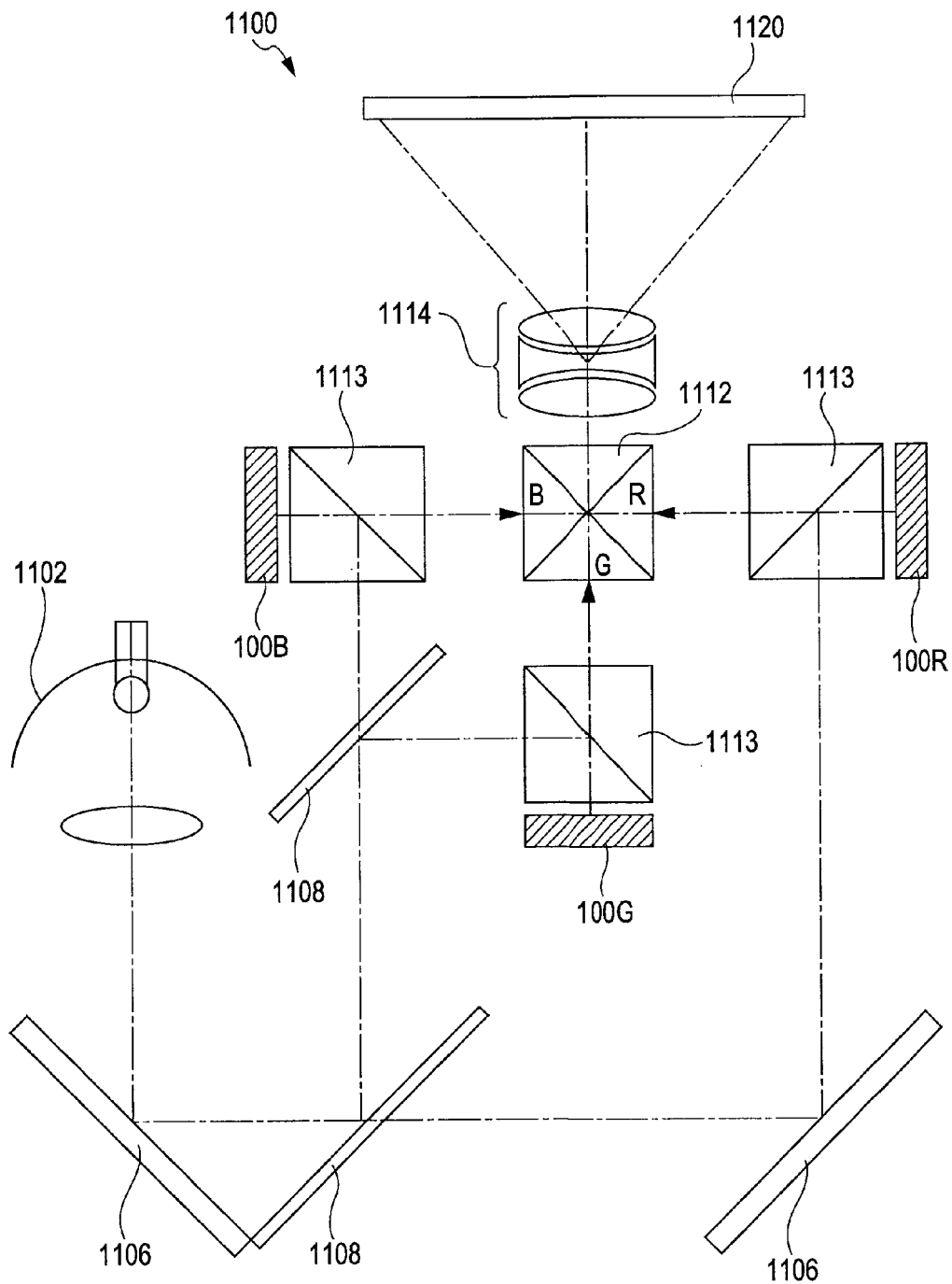
FIG. 9 is a plan view showing a configuration of a projector as an example of an electronic apparatus to which the electro-optic device is applied.

Subsequently, a case in which the liquid crystal device as the electro-optic device described above is applied to various types of electronic apparatuses will be described. Here, a projecting-type liquid crystal projector is exemplified as an electronic apparatus according to the invention. FIG. 9 is a diagrammatic cross-sectional view of the projecting-type liquid crystal projector according to the embodiment.

In FIG. 9, a liquid crystal projector 1100 according to the embodiment is constructed as a multiple plate color projector using three liquid crystal light valves 100R, 100G, and 100B for RGB respectively. The liquid crystal light valves 100R, 100G, and 100B each employ a reflective liquid crystal device described above.

As shown in FIG. 9, in the liquid crystal projector 1100, if projecting light is emitted from a lamp unit 1102 as a white light source such as metal halide lamp, the emitted light is split into light components R, G, and B corresponding to the three primary colors of RGB by two mirrors 1106, two dichroic mirrors 1108, and three polarization beam splitters (PBS) 1113, and the light is guided respectively to the liquid crystal light valves 100R, 100G, and 100B corresponding to the respective colors. In this case, a lens may be provided as needed in the midpoint of the optical path in order to prevent light loss in the optical path. Then, the light components corresponding to the three primary colors modulated respectively by the liquid crystal light valves 100R, 100G, and 100B are combined by a cross prism 1112, and then projected on a screen 1120 via a projection lens 1114 as a color video.

Since the lights corresponding to the respective primary colors, namely, R, G, and B enters the liquid crystal light valves 100R, 100G, and 100B by the dichroic mirror 1108 and the polarization beam splitter 1113, it is not necessary to provide a color filter.

In addition to electronic apparatus described above with reference to FIG. 9, mobile personal computers, cellular phones, liquid crystal TVs, view-finder type and monitor direct view video tape recorders, car navigation apparatuses, pagers, electronic notepads, calculators, word processors, work stations, TV telephone sets, POS terminals, apparatuses having a touch panel, and so on are exemplified. Needless to say, the electro-optic device in the invention can be applied to the various types of electronic apparatuses exemplified above.

The invention is also applicable to transmissive liquid crystal apparatuses, plasma displays (PDP), Field Emission Displays (FED, SED), organic EL displays, Digital Micromirror Device (DMD), and electrophoresis apparatuses and so on.

The invention is not limited to the embodiment described above, and may be modified as needed without departing the scope and thought of the invention read from Claims, and the entire specification. Therefore, the electro-optic device modified in a manner described above and the electronic apparatus having the modified electro-optic device are also included in a technological range of the invention.

The entire disclosure of Japanese Patent Application No. 2010-12894, filed Jan. 25, 2010 is expressly incorporated by reference herein.

What is claimed is:

1. An electro-optic device, comprising:
an electro-optical panel having an element substrate, an opposed substrate, and an electro-optic substance held between the element substrate and the opposed substrate;
a dust-proof substrate having a first surface and a second surface opposite to the first surface, the first surface being bonded to the opposed substrate; and
a light-shielding panel in direct contact with the second surface of the dust-proof substrate;
wherein the dust-proof substrate is formed of a material coefficient of linear expansion of an opposite polarity from a material of each of the opposed substrate and the light-shielding panel, and
wherein the opposed substrate is formed of the first material having the coefficient of linear expansion of the positive polarity, and the dust-proof substrate is formed of the second material having the coefficient of linear expansion of the negative polarity.

2. The electro-optic device according to claim 1, wherein the element substrate is formed of a material having a coefficient of linear expansion having the same polarity as the opposed substrate.

3. The electro-optic device according to claim 1, wherein the first material is quartz and the second material is neoserum.

4. The electro-optic device according to claim 1, wherein the electro-optic panel is a reflective electro-optic panel.

5. The electro-optic device according to claim 1, wherein the element substrate is formed of a material having a coefficient of linear expansion of the positive polarity.

6. The electro-optic device according to claim 5, wherein the light-shielding panel is formed of a material having a coefficient of linear expansion of the positive polarity.

7. The electro-optic device according to claim 6, wherein the first material having the coefficient of linear expansion of the positive polarity is quartz.

8. An electro-optic device, comprising:
an electro-optical panel having an element substrate, an opposed substrate, and an electro-optic substance held between the element substrate and the opposed substrate;
a dust-proof substrate having a first surface and a second surface opposite to the first surface, the first surface being bonded to the opposed substrate; and
a light-shielding panel in direct contact with the second surface of the dust-proof substrate;
wherein the dust-proof substrate is formed of a material coefficient of linear expansion of an opposite polarity from a material of each of the opposed substrate and the light-shielding panel, and
wherein the opposed substrate is formed of the first material having the coefficient of linear expansion of the negative polarity, and the dust-proof substrate is formed of the second material having the coefficient of linear expansion of the positive polarity.

9. The electro-optic device according to claim 8, wherein the element substrate is formed of a material having a coefficient of linear expansion of the negative polarity.

10. The electro-optic device according to claim 9, wherein the light-shielding panel is formed of a material having a coefficient of linear expansion of the negative polarity.

11. The electro-optic device according to claim 10, wherein the second material having the coefficient of linear expansion of the positive polarity is quartz.

* * * * *